United States Patent [19]

Robinson

[11] 4,414,683

[45] Nov. 8, 1983

[54] FILM HOLDER SUPPORT APPARATUS

[76] Inventor: David R. Robinson, 8840 Nedonna Beach Rd., Rockaway, Oreg. 97136

[21] Appl. No.: 248,014

[22] Filed: Mar. 26, 1981

[51] Int. Cl.³ .............................................. G03B 41/16
[52] U.S. Cl. ..................................... 378/177; 378/181
[58] Field of Search ......................... 378/177, 181, 167

[56] References Cited

U.S. PATENT DOCUMENTS 2,876,359 3/1959 Plymale .............................. 378/181

*Primary Examiner*—Craig E. Church
*Attorney, Agent, or Firm*—Chernoff, Vilhauer, McClung, Birdwell & Stenzel

[57] ABSTRACT

An apparatus for placing film in the proper position for taking an x-ray or similar image of a patient lying on a bed having a compressible mattress is comprised of a base which supports the apparatus and is arranged for fitting between the bed and the mattress. A film holder, which is arranged for removably receiving and carrying a film cassette is adjustably positioned above the mattress adjacent to the patient by a positioning apparatus which is interconnected to both the base and the film holder. A locking device associated with the positioning apparatus locks the film holder relative to the base when it is in its desired location. Accordingly, the film holder support apparatus can be used to compress the mattress alongside of the patient thereby permitting the film to be placed in a location adjacent to the patient which would otherwise be occupied by the mattress. The locking device is arranged to be automatically engaged when the film holder is placed in position and in one embodiment utilizes the compressible nature of the mattress itself to achieve locking.

3 Claims, 5 Drawing Figures

U.S. Patent
Nov. 8, 1983
4,414,683
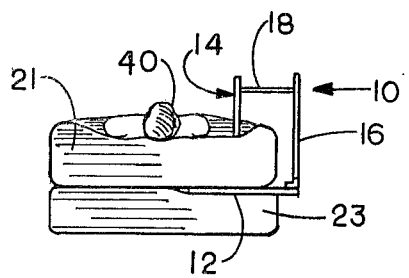
FIG. 4
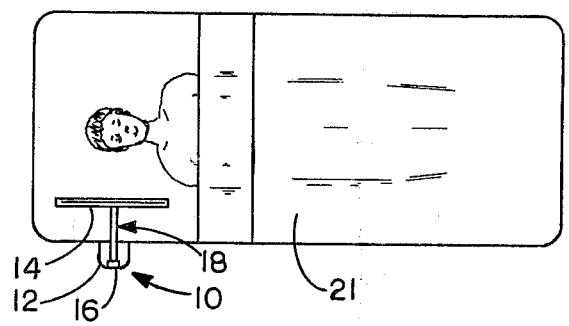
FIG. 5
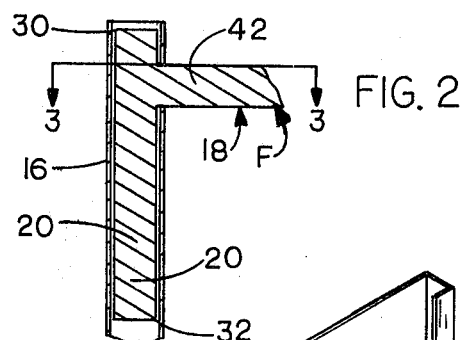
FIG. 2
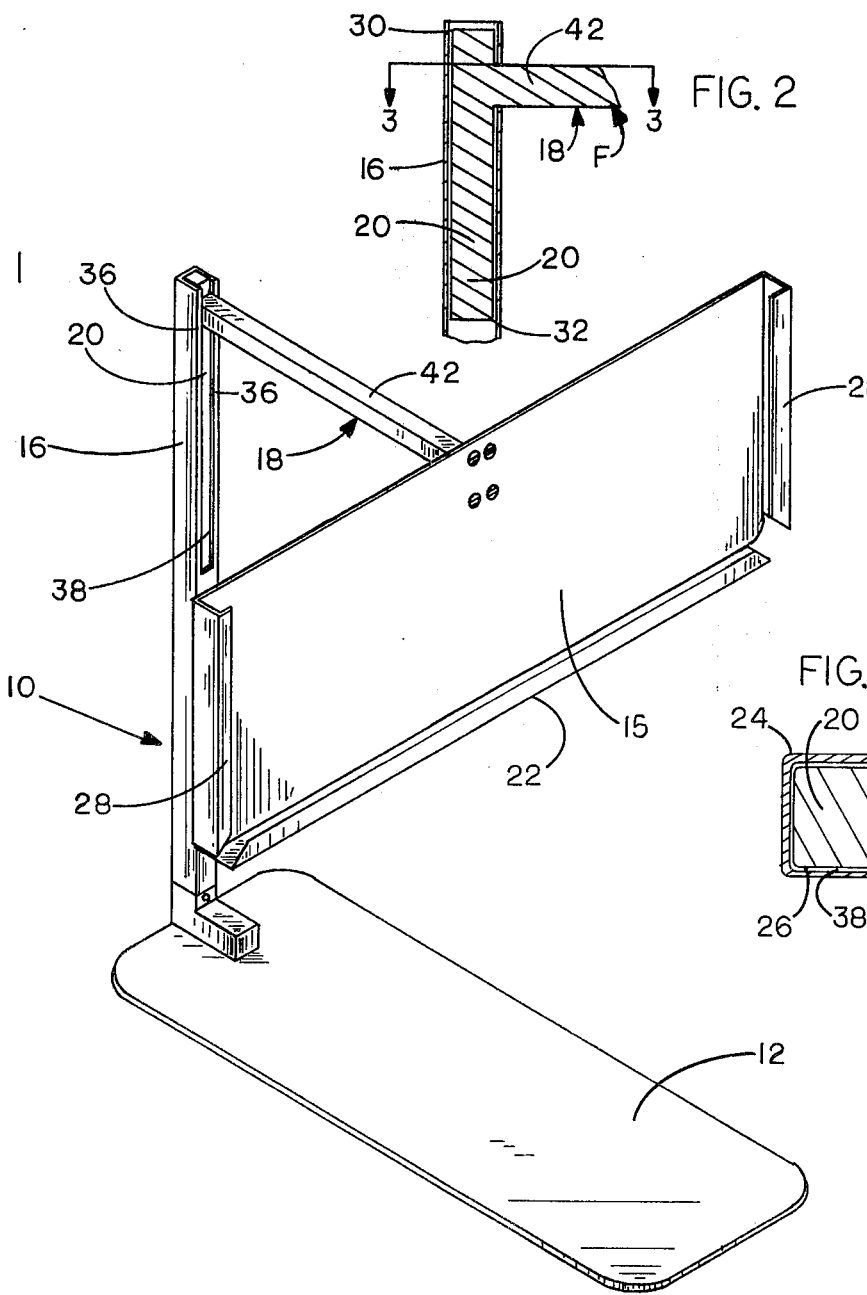
FIG. 1
FIG. 3

FILM HOLDER SUPPORT APPARATUS

BACKGROUND OF THE INVENTION

This invention relates to improvements in apparatus for holding and positioning film for making x-rays, thermographs and other types of images, and in particular it relates to obtaining such images when patients can not be moved from their beds, but must have the procedure performed in situ.

Some types of medical conditions make it difficult for patients to be moved once they have assumed a desired position in bed, either due to the fact that they have serious injuries, they are unconscious, or because they would experience severe pain if they were moved. For example, patients with certain types of arthritis experience severe pain when they are placed on an unyielding surface such as a typical x-ray table, or when they are required to move even a small amount. In these circumstances, many procedures must be performed while the patient remains in bed.

When patients in this condition are lying on a bed of a soft compressible nature, technicians taking images, such as x-rays, frequently incur difficulty in placing the film in the proper position to obtain the desired image of an inflicted portion of the patient's body. This is particularly true if the patient is heavy and locally compresses the surface of the bed substantially so that uncompressed portions of the bed prevent placing the film at the desired location. Faced with this type of situation, technicians frequently resort to one or more of several stratagems for placing the film holder in the proper locations for good exposure.

One such technique for placing the film holder in the optimum position adjacent to that portion of the patient of which it is desired to obtain a picture, is to place heavy objects, such as sand bags, alongside the film holder so as to depress the uncompressed portions of the bed sufficiently to enable the film holder to be perfectly placed for the desired exposure.

If satisfactory objects are not available, or if there is not sufficient room on the bed to place them appropriately, the technician often will sit on or press the bed down adjacent to the film holder to obtain the desired amount of compression of the mattress so that the film holder can be properly placed for the desired exposure. This latter technique is highly undesirable for the technician because it may result in unnecessary exposure to x-ray radiation.

What is needed, therefore, is some means of compressing the bed alongside of the patient, and thereby permitting placement of the film, which does not require placement of heavy objects on the bed or the personal intervention of the technician during exposure. Several film holders have been developed which could possibly be used to solve this problem, but since they were designed for other purposes, they all have shortcomings which make them unsuitable for the subject purpose.

For example, one device provides a dolly which can be wheeled into position alongside of the bed and the wheels locked. A film holder, carried by the dolly, can be extended laterally to reach the patient and adjusted vertically to the desired height, and then clamped into position. However, because the device is made to be easily portable, it is not heavy enough so that the film holder can be adjusted to compress the bed sufficiently to obtain the desired image. In addition, a device of this type which was of sufficient weight to properly compress the bed would be unwieldy to move about.

Other film holders, which are more portable, are designed to permit exposure of young children, which sit on the base of the fixture while it rests on a table. This type of device can also be used to permit exposure of adults by supporting the film in a desired location relative to a seated patient. However, devices of this type do not provide the necessary degree of adjustability to hold a bed in compression and place the film holder in the desired location.

SUMMARY OF THE PRESENT INVENTION

The present invention overcomes the various shortcomings mentioned above by providing an apparatus which combines in a single device features which solve these problems.

The present invention is directed toward a film holder which, in addition to holding the film, compresses a portion of the bed upon which the patient lies in order to position a holder in an appropriate location adjacent to the portion of the patient's body to be investigated. It does this by a simple procedure which avoids the necessity of requiring assistance from other persons. Thus, this invention permits a more efficient use of hospital manpower, while at the same time avoiding unnecessary exposure to x-ray radiation by hospital personnel and permitting more efficient placement of film to obtain required x-ray or other types of exposure. Normally, the placement and securing in position of the film can be accomplished in one simple sequence of actions by one person.

The invention uses, in the preferred embodiment, the force provided by the mattress itself when it is in a compressible state to lock the device in its desired position. The act of pressing the film holder into the mattress in order to place the film immediately adjacent to the portion of the patient's body that is of interest to the examining physician, will provide the force required to lock the mechanism in the desired position and hold it securely.

The invention is comprised of a base which can be removably inserted under the mattress upon which the patient is lying; a support which is attached to the outer end of the base and extends upwardly; and an L-shape bracket one end of which is attached to a holder for film and the other end of which is adapted to be slidably received by the support.

The upper end of the support includes a C-shaped channel which removably receives the vertical leg of the bracket. The channel and bracket are arranged so that the latter element slides freely in the former element. Accordingly, the position of the film holder can be easily adjusted vertically. However, if the film holder is used to compress a portion of the mattress, and thus place the film adjacent to a patient lying on the mattress, the upward force of the mattress on the film holder imparts a moment on the bracket causing its vertical leg to become misaligned with the C-shaped channel thereby causing it to bind rather translating upwardly. Likewise, if the film holder is not used to compress a mattress, the weight of the film holder places an opposite moment on the bracket again causing its vertical leg to become misaligned with the C-shaped channel and bind therein. Accordingly, the bracket, and thus the film holder, becomes automatically locked when it is placed in position.

Typically, the base is a flat plate of a size which can extend from the edge of the mattress to beyond its center. Affixed to the outer edge of the base is a support which extends upwardly to a higher elevation than the highest extension of the patient's body, in whatever position he is lying.

The film holder preferably has a lower edge of a shape and rigidity which would permit it to be pressed into the mattress without significant distortion and which will receive any standard film pack.

Accordingly, it is a principal objective of the present invention to provide a film holder support apparatus which allows placement of a film pack adjacent to a patient lying on a mattress of a compressible nature.

It is a further object of the present invention to provide such an apparatus which is light weight and portable.

It is a further object of the present invention to provide such an apparatus which utilizes the compressible nature of the mattress to lock itself in place.

The foregoing and other objectives, features and advantages of the present invention will be more readily understood upon consideration of the following detailed description of the invention, taken in conjunction with the accompanying drawings.

BRIEF DESCRIPTION OF THE DRAWINGS

FIG. 1 is a perspective view of an exemplary embodiment of the film holder support apparatus of the present invention.

FIG. 2 is a detailed view of one embodiment of the fastening means, which is a feature of the invention, when it is in its holding configuration.

FIG. 3 is a sectional view taken along the lines 3—3 of FIG. 2, looking in the direction of the arrows.

FIG. 4 is an end elevational view of a bed with a patient lying on it, showing the preferred relationship of the invention to the patient and the bed.

FIG. 5 is a plan view of the bed with the invention in position.

DESCRIPTION OF A PREFERRED EMBODIMENT OF THE INVENTION

Referring to FIG. 1 of the drawings, the film holder support apparatus of the present invention, indicated generally at 10, comprises a base 12, a film holder 14, a support 16, and an L-shaped bracket 18 with a short, downwardly extending vertical leg 20.

The base 12 comprises a planar element having a length sufficient to extend under a substantial portion of the mattress and having a somewhat lesser width. It is thin enough to allow its being inserted between the bed and the mattress as shown in FIG. 4.

The support 16 is preferably made from hollow tubing of square cross-section. In its upper portion, a slot is placed into one of its faces leaving lips 36 attached to each of the adjacent sides, FIG. 3. Thus the upper portion of the support provides a channel 38 having a C-shaped cross-section. The lips 36 of the C-shaped channel are wide enough to partially enclose the vertical leg 20 of the bracket 18. The channel and bracket are dimensioned such that the vertical leg 20 will fit snugly within the channel 38 but will be loose enough to slide freely up and down. The support 16 is fastened to the base 12 in a way that gives a solid and secure fixture.

The horizontal leg 42 of the bracket 18 extends outwardly from the support to a point lying approximately above the middle of the base and the film holder 14 is attached to the end of the horizontal leg 42. The film holder 14 comprises a planar backing plate 15 which is generally the same size as the film which is to be carried. An L-shaped lower lip 22 is attached to the lower edge of the backing plate 15 and L-shaped side lips 28 are attached to each of the side edges of the backing plate. The lips 22 and 28 are arranged to releasably receive and carry a film pack of the type desired.

The lower lip 22 of the film holder is shown pressed into the mattress so that it depresses the surface of the mattress, permitting the film holder to be placed adjacent to the portion of the patient's body of which a picture is sought. Accordingly, the entire film holder, and particularly the lower lip 22, should be sufficiently strong to withstand the forces generated by the mattress being compressed.

In operation, the base 12 is slid between the bed and the mattress, as shown in FIG. 4, until the film holder is in the desired transverse position. The film holder is then adjusted vertically by sliding the vertical leg 20 of the bracket 18 into the channel 38 of the support 16. Since the vertical leg slides freely in the channel this can be easily accomplished. Due to the fact that the bracket fits loosely within the channel, however, the film holder will always automatically remain at the height to which it has been adjusted.

When the film holder is not being used to compress the mattress, the weight of the film holder acting over the lever arm created by the length of the horizontal leg 42 causes the vertical leg 20 to become misaligned with the channel 38. Thus the lower corner 32 of the vertical leg binds on the sides of the channel and prevents further downward movement of the bracket. The greater the downward force which is applied to the film holder, the more the lower edge binds against the sides of the channel. Therefore, the film holder becomes locked in the desired position.

When the film holder is used to compress the mattress 21 the same general results occur. Referring to FIG. 2 the force F which is exerted on the film holder by the compressed mattress again acts through the lever arm of the horizontal leg 42 to cause the vertical leg to become misaligned with the channel. This time the upper corner of the vertical leg rotates outwardly to engage the opposite wall of the support 16 and again the bracket 18 will become immovably engaged in the support 16.

In either case the bracket 18 can only be unlocked by manually aligning the vertical leg in the channel thereby disengaging the respective corners 30 or 32 of the bracket from the surface of the wall of the support 16. The bracket can then be adjusted to any desired position.

Accordingly, it can be seen that the film holder can be easily placed and locked in any desired position and can be quickly readjusted when desired by a single person who, in most cases, will only have to use one hand. Therefore, the film holder support apparatus of the present invention is far simpler and more effective than available in the prior art. There are few adjustments which are needed and they can usually be made by a technician with only one hand. The structure is such that the film holder is securely and accurately placed in use, yet it can be quickly disassembled when finished.

The terms and expressions which have been employed in the foregoing description are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. An apparatus for placement of film relative to a patient lying on a bed having a frame which supports a compressible mattress, said apparatus comprising:
   (a) a base for supporting the apparatus, said base being arranged to allow placement thereof between the bed frame and the mattress;
   (b) film holder means for positioning film above the mattress adjacent to the patient; and
   (c) means for compressing the mattress between said film holder and said base and thereby making said film holder immovable relative to said mattress.

2. The apparatus of claim 1 wherein said means for compressing the mattress comprises:
   (a) an upstanding support which is attached to said base, said support defining a C-shaped channel over at least the upper portion thereof;
   (b) an L-shaped bracket having a vertical leg which slidably communicates within said channel and a horizontal leg which is attached at the outer end thereof to said film holder;
   (c) said vertical leg having a cross-sectional dimension such that when said film holder is subjected to a vertical force, said vertical arm will rotate relative to said channel sufficiently to prevent translational movement of said bracket relative to said support.

3. The apparatus of claim 2 wherein said positioning means and said locking means are co-extensive and comprise slidably engaging elements attached respectively to said base and said film holder, said elements being arranged such that pressure exerted downwardly on said film holder will position said film holder relative to the patient, and pressure exerted upwardly on said film holder locks said elements in place relative to one another.

* * * * *